United States Patent
Nagamatsu et al.

(10) Patent No.: US 9,587,288 B2
(45) Date of Patent: Mar. 7, 2017

(54) GEAR HAVING EXCELLENT SEIZING RESISTANCE

(71) Applicant: KOBE STEEL, LTD., Kobe-shi (JP)

(72) Inventors: Sayaka Nagamatsu, Kobe (JP); Yosuke Shindo, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 20 days.

(21) Appl. No.: 14/383,726

(22) PCT Filed: Mar. 29, 2013

(86) PCT No.: PCT/JP2013/059737
§ 371 (c)(1),
(2) Date: Sep. 8, 2014

(87) PCT Pub. No.: WO2013/147258
PCT Pub. Date: Oct. 3, 2013

(65) Prior Publication Data
US 2015/0038380 A1    Feb. 5, 2015

(30) Foreign Application Priority Data

Mar. 30, 2012 (JP) ................. 2012-082613

(51) Int. Cl.
C22C 38/18 (2006.01)
C22C 38/40 (2006.01)
(Continued)

(52) U.S. Cl.
CPC ............. *C21D 9/32* (2013.01); *C10M 103/06* (2013.01); *C21D 1/06* (2013.01); *C21D 6/002* (2013.01);
(Continued)

(58) Field of Classification Search
CPC .................... F16C 2361/65; F16C 2361/61
(Continued)

(56) References Cited

U.S. PATENT DOCUMENTS

2005/0045248 A1   3/2005  Otani et al.
2009/0192063 A1*  7/2009  Gray ................... C10M 163/00
                                                    508/372
(Continued)

FOREIGN PATENT DOCUMENTS

EP    1 243 815 A2   9/2002
EP    1 243 815 A3   9/2002
(Continued)

OTHER PUBLICATIONS

International Search Report and Written Opinion of the International Searching Authority issued Jun. 18, 2013 in PCT/JP13/059737 filed Mar. 29, 2013.
(Continued)

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

This gear has a predetermined chemical composition and has, in a surface-layer part, a texture of tempered martensite and/or tempered bainite and a steel material texture in which retained austenite exists in 1-10% by area percentage and in which a carbide is deposited in at least 5% by area percentage, and the nitrogen content at a depth of 20 μm below the surface is 2.0-6.0%. Thus, a gear that achieves even better seizing resistance in a power transmission part subjected to high rotation and high slippage and using a low-kinematic-viscosity lubricating oil is provided.

20 Claims, 2 Drawing Sheets

(51) Int. Cl.

| | |
|---|---|
| *C22C 38/22* | (2006.01) |
| *F16C 33/12* | (2006.01) |
| *C21D 9/32* | (2006.01) |
| *C21D 1/06* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/38* | (2006.01) |
| *C23C 8/34* | (2006.01) |
| *C23C 8/80* | (2006.01) |
| *C10M 103/06* | (2006.01) |
| *C21D 6/00* | (2006.01) |
| *C21D 6/02* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/42* | (2006.01) |
| *C22C 38/58* | (2006.01) |
| *C23C 8/26* | (2006.01) |
| *F16H 57/00* | (2012.01) |
| *F16H 57/04* | (2010.01) |
| *F16H 55/06* | (2006.01) |

(52) U.S. Cl.
CPC ............ *C21D 6/004* (2013.01); *C21D 6/005* (2013.01); *C21D 6/008* (2013.01); *C21D 6/02* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/58* (2013.01); *C23C 8/26* (2013.01); *C23C 8/34* (2013.01); *C23C 8/80* (2013.01); *F16H 57/00* (2013.01); *F16H 57/041* (2013.01); *C21D 2211/001* (2013.01); *C21D 2211/002* (2013.01); *C21D 2211/004* (2013.01); *C21D 2211/008* (2013.01); *F16H 55/06* (2013.01)

(58) Field of Classification Search
USPC .................. 508/100, 103; 420/104, 106, 108
See application file for complete search history.

(56) References Cited

U.S. PATENT DOCUMENTS

| | | |
|---|---|---|
| 2010/0139811 A1 | 6/2010 | Kozawa et al. |
| 2011/0041959 A1 | 2/2011 | Mizuno et al. |
| 2011/0186182 A1* | 8/2011 | Chida .................... B32B 15/04 148/318 |
| 2013/0133792 A1 | 5/2013 | Nakagaito et al. |

FOREIGN PATENT DOCUMENTS

| | | |
|---|---|---|
| EP | 2 388 351 A1 | 11/2011 |
| JP | 62 211094 | 9/1987 |
| JP | 6 172961 | 6/1994 |
| JP | 9 53148 | 2/1997 |
| JP | 11 199983 | 7/1999 |
| JP | 3524229 B2 | 2/2004 |
| JP | 2005 068453 | 3/2005 |
| JP | 2005-232543 A | 9/2005 |
| JP | 2006 225741 | 8/2006 |
| JP | 2007 246941 | 9/2007 |
| JP | 2007 284739 | 11/2007 |
| JP | 2007 308772 | 11/2007 |
| JP | 2009 249700 | 10/2009 |
| JP | 2010 70827 | 4/2010 |
| JP | 2010 150566 | 7/2010 |
| JP | 2011 225936 | 11/2011 |
| JP | 2012 1774 | 1/2012 |
| TW | 201209179 A1 | 3/2012 |
| WO | 2009 054530 | 4/2009 |
| WO | WO 2012/020511 A1 | 2/2012 |

OTHER PUBLICATIONS

Extended European Search Report issued on Mar. 9, 2016 in European Patent Application No. 13767691.2.

* cited by examiner

GEAR HAVING EXCELLENT SEIZING RESISTANCE

TECHNICAL FIELD

The present invention relates to a gear that has excellent seizing resistance and is for use in a moving part subjected to high rotation and high slippage. In particular, the invention relates to a gear useful for an electric car motor.

BACKGROUND ART

For example, it is known that a machine structural component usable for a power transmission part, such as a gear for car transmission, may develop pitching damage, i.e., peel failure of a metal contact portion due to increased pressure of contacted surface during use thereof. Thus, a steel component for use in such an application includes a component prepared in such a manner that one of various types of case-hardening steel such as SCr, SCM, and SNCM is subjected to forming through hot forging and cutting, and is then subjected to surface hardening treatment such as carburizing treatment or carbonitriding treatment, and furthermore a solid lubrication film such as a molybdenum disulfide film is provided on a surface of the component.

In recent years, however, a machine structural part is increasingly demanded to have higher output power, smaller size, and lighter weight, and thus the machine structural element for use in such a power transmission part tends to increasingly receive a higher load. As a result, it is becoming difficult to achieve the required pitching resistance not only by the component including one of various types of case-hardening steel such as SCr, SCM, and SNCM subjected to surface hardening treatment, but also by the component on which the solid lubrication film is further provided.

In an electric car, which is recently increasingly produced in light of reduction in environmental load, since rotation of a motor is directly transmitted to a reduction gear, such components are subjected to higher rotation than in a gasoline-powered vehicle. Furthermore, since a lubricating oil for use in the electric car has a kinematic viscosity in use environment lower than that for use in the gasoline-powered vehicle, a thin oil film is formed on a surface of each of such steel components configuring the power transmission part. In such environment, a site having almost no oil film thereon may be locally formed. In particular, along with increase in rotation and/or slippage, oil temperature increases, and kinematic viscosity of the lubricating oil tends to be lowered, and the sites each having almost no oil film thereon further increases. In such environment, therefore, steel components easily wear due to metal contact therebetween, and each steel component is easily softened through temperature rise due to friction heat; hence, seizing is likely to occur in an early stage.

Various technologies have been proposed on steel members usable in the environment as described above. For example, PTL 1 discloses a component having high resistance to pressure of contacted surface, which is composed of steel that contains C: 0.15 to 0.40%, Si: 0.50 to 1.50%, Mn: 0.20 to 1.50%, Cr: 0.50 to 1.50%, Mo: 0.05 to 0.50%, at least one element selected from the group consisting of Ni: 0.50 to 3.50%, Ti: 0.03 to 0.20%, Nb: 0.03 to 0.15%, and Al: 0.01 to 0.10%, and P: 0.010% or less, with the remainder consisting of Fe and inevitable impurities, wherein a rolling site of a surface of the component has a carbon content of 0.8 to 1.2%.

However, in this technology, the carbon content is provided through carburizing or carbonitriding treatment without nitriding treatment. Hence, the nitrogen amount of a surface layer is small, less than 1%. Consequently, if this component is used in an environment where seizing more easily occurs, the component cannot maintain excellent seizing resistance.

PTL 2 discloses a method of manufacturing a machine structural component having excellent fatigue strength, particularly surface fatigue strength, the method being characterized in that steel is used as a material, the steel containing C: 0.4 to 0.7%, Si: 0.3% or less, Mn: 0.2 to 1%, Cr: 0.2 to 3%, Mo: 0.1 to 1%, V: 0.1 to 1%, Al: 0.01 to 0.05%, N: 0.003 to 0.02%, S: 0.07% or less, and Ti: 0.002% or less, with the remainder consisting of Fe and inevitable impurities including P and O that are controlled, respectively, to be 0.02% or less and 0.002% or less, the material is formed into a predetermined component shape, and is then subjected to nitriding treatment or nitrocarburizing treatment and successively subjected to induction hardening treatment so that nitrogen is diffused from a surface of the component, and a surface-hardened layer having a nitrogen content of 0.05% or more is formed at a depth position of at least 0.2 mm from a top surface of the component.

However, since this technology includes the diffusion treatment of surface nitrogen, the surface layer cannot maintain high nitrogen content. In addition, since carbide is not dispersed in a surface layer of the component, the component cannot exhibit good seizing resistance in a high slippage environment.

PTL 3 discloses a method of manufacturing a rotary hook of a sewing machine, the method being characterized in that case-hardening steel such as carbon case-hardening steel and chromium-molybdenum case-hardening steel is subjected to carburizing-and-quenching and tempering, and further subjected to nitrocarburizing treatment. In this technology, however, only typical carburizing treatment is performed, and carbide does not dispersedly exist in a surface layer of a component. Hence, the component cannot exhibit excellent seizing resistance in a high slippage environment.

CITATION LIST

Patent Literature

PTL 1: Japanese Unexamined Patent Application Publication No. 2005-68453.
PTL 2: Japanese Unexamined Patent Application Publication No. H06-172961.
PTL 3: Japanese Unexamined Patent Application Publication No. S62-211094.

SUMMARY OF INVENTION

Technical Problem

An object of the invention, which has been made to solve such issues of the background art, is to provide a gear that exhibits more excellent seizing resistance in a power transmission part subjected to high rotation and high slippage, for which the lubricating oil having a low kinematic viscosity is used, and is useful for an electric car motor.

Solution to Problem

A gear of the present invention, which has succeeded in solving the above-described issues, containing C: 0.15 to 0.45% (by mass percent, the same shall apply hereinafter to the chemical compositions), Si: 0.05 to 1.0%, Mn: 1.0 to 2.0%, P: 0.05% or less, S: 0.05% or less, Cr: 0.9 to 2%, Al: 0.01 to 0.1%, and N: 0.02% or less, with the remainder consisting of Fe and inevitable impurities, the gear being summarized by having a surface-layer part that has a steel microstructure including at least one phase of tempered martensite and tempered bainite, 1 to 10% retained austenite by area percentage, and at least 5% carbide being precipitated by area percentage, and the gear having a nitrogen content of 2.0 to 6.0% at a depth of 20 μm below a surface of the gear.

The gear of the invention further effectively contains, as necessary, (a) Mo: 0.5% or less (not including 0%), (b) at least one element selected from the group consisting of V: 0.2% or less (not including 0%), Ti: 0.1% or less (not including 0%), and Nb: 0.2% or less (not including 0%), (c) B: 0.01% or less (not including 0%), (d) at least one element selected from the group consisting of Cu: 5% or less (not including 0%) and Ni: 5% or less (not including 0%), or the like. The gear is further improved in properties depending on the contained component.

In the gear of the invention, it is also a preferred requirement that a nitrided layer having a content of iron nitride of 80 mass % or more exists in the surface-layer part ranging from the surface to the depth of 20 μm, and the nitrided layer has a proportion of $Fe_4N$ of 20 mass % or more in the iron nitride. The gear of the invention also includes a gear having a lubrication film on its surface. The gear of the invention is useful as a gear for an electric car motor.

Advantageous Effects of Invention

In the gear of the invention, the chemical composition is appropriately adjusted, and the surface-layer part has the microstructure including a predetermined area percentage of carbide and a predetermined amount of retained austenite together with at least one phase of tempered martensite and tempered bainite, and the nitrogen content is 2.0 to 6.0% at the depth of 20 μm below the surface of the gear. Hence, the gear exhibits more excellent seizing resistance in a power transmission part subjected to high rotation and high slippage, for which the lubricating oil having a low kinematic viscosity is used, and is extremely useful for an electric car motor.

DESCRIPTION OF EMBODIMENTS

The gear having excellent seizing resistance of the present invention is characterized in that (i) nitrogen content is 2.0 to 6.0% at a depth of 20 μm below a surface of the gear, (ii) area percentage of carbide in a surface-layer part is 5% or more, and (iii) area percentage of retained austenite in the surface-layer part is 1 to 10%.

A cause of pitching damage, which occurs mainly in a gasoline-powered vehicle, has been considered as follows: friction heat is generated due to gear-to-gear metal contact caused by oil film shortage, and each gear is thermally softened, leading to pitching damage. To achieve a gear component having excellent pitching resistance, it is effective that the component itself is increased in surface strength, internal strength, or temper softening resistance, and the pitching resistance has been improved by such an increase in strength. In a gear for an electric car motor, however, slippage speed between tooth flanks is at least several times higher than a gear for a gasoline-powered vehicle, and a damage mechanism is changed into seizing. Hence, improvement guidelines cannot be found through an extension of increase in surface strength, internal strength, or temper softening resistance of the component itself.

The inventors have investigated in detail a seizing occurrence mechanism in a region of extremely high slippage speed. As a result, it has been clarified that interatomic bond, i.e., adhesion wear, which is caused by wear occurring in an environment of high temperature, high pressure, and high slippage, is dominant. As a result of further investigation, the inventors have found that in order to suppress the interatomic bond even in the environment where adhesion wear easily occurs, it is effective to increase the N content (nitrogen content) of the surface-layer part of the gear. In addition, they also found that it is effective to form a large number of iron nitride particles rather than particles of a nitrides of added elements, and to appropriately control a composition of the iron nitride. In addition, they have found that it is also effective to disperse carbide particles in a sliding part (surface layer) of the component. They found that the seizing resistance can be markedly improved through a synergetic effect of such measures, and eventually completed the invention.

An estimated mechanism of improvement of seizing resistance of the invention is considered as follows. Specifically, controlling the N content (nitrogen content) of the surface-layer part as in the (i) allows N to be controlled into an iron nitride composition being thermally more stable, and allows interatomic bond to be suppressed even in a metal contact portion. Controlling the amount of carbide of the surface-layer part as in the (ii) allows adhesion wear to be suppressed through existence of the chemically stabile carbide, as with the effect of iron nitride.

However, marked improvement in seizing resistance cannot be exhibited through such an effect given by one of (i) and (ii). A gear having excellent seizing resistance can be achieved only through the synergetic effect of (i) and (ii). In the invention, the amount of retained austenite is defined as in the (iii). Using work-induced transformation of the retained austenite makes it possible to suppress occurrence and development of cracks during application of a repeated impact load. In other words, satisfying the requirements of (i) to (iii) makes it possible to achieve a gear having not only excellent seizing resistance but also excellent low-cycle fatigue properties. Specific functions and effects given by defining such requirements are as follows.

[Requirement of (i)]

To improve the seizing resistance of the gear, the nitrogen content must be 2.0 to 6.0% at a depth position of 20 μm below a surface of the gear. If the nitrogen content at the position is below 2.0%, interatomic bond due to metal contact easily occurs, and thus adhesion wear occurs. On the other hand, if the nitrogen content exceeds 6.0%, an atomic structure of nitride in the vicinity of the surface layer is changed, and therefore adhesion wear rather easily occurs. The lower limit of the nitrogen content is preferably 3.2% or more (more preferably 3.5% or more). The upper limit thereof is preferably 5.8% or less (more preferably 5.5% or less).

[Requirement of (ii)]

Precipitating a large number of carbide particles in the surface-layer part of the gear makes it possible to improve the seizing resistance in a high slippage environment. The carbide existing in the surface-layer part also has a function of helping nitrogen to be markedly thickened in the surface-layer part through nitriding. To achieve this, the area percentage of carbide in the surface-layer part must be 5% or more. If the area percentage of the carbide is below 5%, nitrogen in the vicinity of the surface-layer part is insufficiently thickened, and the effect of improving the seizing resistance by the carbide itself is also insufficient; hence, the predetermined seizing resistance is not provided. The area percentage of the carbide is preferably 6% or more, and more preferably 7% or more.

[Requirement of (iii)]

The retained austenite makes it possible to suppress occurrence and development of cracks through work-induced transformation thereof during application of a repeated impact load. To achieve this, the retained austenite must be allowed to exist at least 1% by area percentage in steel. However, if the retained austenite exists more than 10% by area percentage, the gear component is softened, and adhesion wear easily occurs. The lower limit of the area percentage of the retained austenite is preferably 2% or more (more preferably 3% or more). The upper limit thereof is preferably 9% or less (more preferably 8% or less).

The microstructure defined in the invention is as described above, and a matrix phase as the remainder is substantially configured of tempered martensite, tempered bainite, or a composite phase of them (a phase consisting of tempered martensite and tempered bainite). After nitriding treatment, however, steel may have phases other than such a matrix phase therein, for example, ferrite, perlite, bainitic ferrite, as-quenched martensite, and as-quenched bainite. Such phases have bad influence on variation in gear property and on seizing resistance of the gear, and are therefore desired to be not formed to the utmost. However, only in the case where the phases such as ferrite, perlite, bainitic ferrite, as-quenched martensite, and as-quenched bainite exist at a rate of 5% or less by area percentage, the phases have no bad influence on the functions of the invention and are therefore allowed to be contained.

The gear of the invention must also be appropriately adjusted in chemical composition to exhibit properties of a final product (gear component). The reason for defining a range of each component (element) of the chemical composition is as follows.

[C: 0.15 to 0.45%]

C is an element necessary for securing core hardness required for a machine structural steel component. When the C content is less than 0.15%, the core hardness is insufficient, and strength is insufficient as the machine structural steel component. However, if the C content is excessive, the amount of infiltration of carbon during carburizing is decreased, and the amount of precipitated carbide is decreased. In addition, the core hardness is excessively increased, and cold forgeability and machinability are degraded. Hence, the C content must be controlled to be 0.45% or less. The lower limit of the C content is preferably 0.18% or more (more preferably 0.20% or more). The upper limit thereof is preferably 0.40% or less (more preferably 0.35% or less).

[Si: 0.05 to 1.0%]

Si exhibits an effect of suppressing lowering of hardness through increasing temper softening resistance. To allow such an effect to be exhibited, Si must be contained 0.05% or more. However, if the Si content is excessive, a tool life in cold forging is shortened, and machinability is degraded. Hence, the Si content must be 1.0% or less. The lower limit of the Si content is preferably 0.10% or more (more preferably 0.15% or more). The upper limit thereof is preferably 0.8% or less (more preferably 0.5% or less).

[Mn: 1.0 to 2.0%]

Mn has an effect of enhancing solution strengthening of a matrix and hardenability, and an effect of accelerating formation of retained austenite. To allow such effects to be exhibited, Mn must be contained 1.0% or more. However, if the Mn content is excessive, content of MnO that is a lower oxide increases, and thus fatigue properties are degraded, and workability and machinability are significantly degraded. Hence, the Mn content must be 2.0% or less. The lower limit of the Mn content is preferably 1.1% or more (more preferably 1.2% or more). The upper limit thereof is preferably 1.8% or less (more preferably 1.7% or less).

[P: 0.05% or Less]

P segregates in a grain boundary and shortens a fatigue life, and therefore must be reduced as much as possible. In particular, if the P content exceeds 0.05%, the fatigue life is markedly shortened. Consequently, the P content is defined to be 0.05% or less. The P content is preferably 0.045% or less, and more preferably 0.040% or less.

[S: 0.05% or Less]

S is an element that forms sulfide. If the S content exceeds 0.05%, the fatigue life is shortened due to formation of coarse sulfide. Consequently, the S content is defined to be 0.05% or less. The S content is preferably 0.045% or less, and more preferably 0.040% or less.

[Cr: 0.9 to 2%]

Cr effectively functions to increase strength and improve seizing resistance through improvement of hardenability and formation of stable carbide. To allow such effects to be exhibited, Cr must be contained 0.9% or more. However, if the Cr content is excessive, carbide is coarsened, and fatigue properties and machinability are degraded. Hence, the Cr content must be 2.0% or less. The lower limit of the Cr content is preferably 1.1% or more (more preferably 1.2% or more). The upper limit thereof is preferably 1.9% or less (more preferably 1.8% or less).

[Al: 0.01 to 0.1%]

Al functions as a deoxidizer, and has a function of improving internal quality of steel through decreasing the amount of oxide-based inclusion. Hence, an appropriate amount of Al is preferably contained. From such a viewpoint, the Al content is defined to be 0.01% or more. However, if the Al content is excessive, coarse and hard inclusion ($Al_2O_3$) is formed, and fatigue properties are degraded. Hence, the Al content must be 0.1% or less. The lower limit of the Al content is preferably 0.015% or more (more preferably 0.020% or more). The upper limit thereof is preferably 0.08% or less (more preferably 0.06% or less).

[N: 0.02% or Less]

N binds to Al to form AlN and thus has an effect of reducing grain size. On the other hand, if the N content is excessive, cracks easily occur during rolling. Hence, the N content must be limited to 0.02% or less. The N content is preferably 0.018% or less, and more preferably 0.016% or less.

The basic components of the gear of the invention are as described above, and the remainder consists of iron and inevitable impurities (for example, Sb and Mg). The gear of the invention may contain, as necessary, (a) Mo: 0.5% or less (not including 0%), (b) at least one element selected from the group consisting of V: 0.2% or less (not including 0%), Ti: 0.1% or less (not including 0%), and Nb: 0.2% or less (not including 0%), (c) B: 0.01% or less (not including 0%), (d) at least one element selected from the group consisting of Cu: 5% or less (not including 0%) and Ni: 5% or less (not including 0%), or the like. The gear is further improved in properties depending on the contained component. The reason for setting the preferable range of each of the elements is as follows.

[Mo: 0.5% or Less (not Including 0%)]

Mo is an element that has an effect of significantly improving hardenability in quenching, and is effective for improving shock strength. However, if the Mo content is excessive, material hardness increases and machinability is worsened. Furthermore, since Mo is an expensive element, such excessive Mo content causes cost increase. Hence, the Mo content is preferably 0.5% or less. The Mo content is more preferably 0.45% or less, and most preferably 0.40% or less. To allow the effects of Mo to be effectively exhibited, Mo is preferably contained 0.05% or more, more preferably 0.07% or more (most preferably 0.10% or more).

[At Least One Element Selected from Group Consisting of V: 0.2% or Less (not Including 0%), Ti: 0.1% or Less (not Including 0%), and Nb: 0.2% or Less (not Including 0%)]

V, Ti, and Nb are each an element that is effective for improving seizing resistance through increasing surface hardness of the gear. Detailed functions and effects of each of the elements are as follows.

V binds to each of interstitial N and interstitial C resulted from nitrocarburizing so that fine vanadium carbide/nitride (carbide, nitride, or carbonitride containing vanadium) is precipitated in a surface layer, and thereby increases surface hardness, and improves seizing resistance. However, if the V content is excessive to exceed 0.2%, the vanadium carbide/nitride is easily coarsened, and thus surface hardness is lowered, and fatigue strength is degraded. The V content is preferably 0.19% or less, and more preferably 0.18% or less. To allow the effects of V to be effectively exhibited, V is preferably contained 0.05% or more, more preferably contained 0.06% or more (most preferably contained 0.07% or more).

Ti binds to each of interstitial N and interstitial C resulted from nitrocarburizing so that fine titanium carbide/nitride (carbide, nitride, or carbonitride containing titanium) is precipitated, and thereby increases surface hardness, and improves seizing resistance. However, if the Ti content is excessive to exceed 0.1%, the titanium carbide/nitride is easily coarsened, and thus surface hardness is lowered, and fatigue strength is degraded. The Ti content is more preferably 0.09% or less, and most preferably 0.08% or less. To allow the effects of Ti to be effectively exhibited, Ti is preferably contained 0.03% or more, more preferably 0.04% or more (most preferably 0.05% or more).

Nb binds to each of interstitial N and interstitial C resulted from nitrocarburizing so that fine niobium carbide/nitride (carbide, nitride, or carbonitride containing niobium) is precipitated, and thereby increases surface hardness, and improves seizing resistance. However, if the Nb content is excessive to exceed 0.2%, the niobium carbide/nitride is easily coarsened, and thus surface hardness is lowered, and fatigue strength is degraded. The Nb content is more preferably 0.19% or less, and most preferably 0.18% or less. To allow the effects of Nb to be effectively exhibited, Nb is preferably contained 0.05% or more, more preferably 0.06% or more (most preferably 0.07% or more).

[B: 0.01% or Less (not Including 0%)]

B exhibits an effect of markedly improving hardenability, and is effective for increasing shock strength. However, if the B content is excessive, B compounds are excessively precipitated and grain boundary strength is lowered, leading to degradation in fatigue strength. From such a viewpoint, the B content is preferably 0.01% or less. The B content is more preferably 0.007% or less, and most preferably 0.004% or less.

[At Least One Element Selected from Group Consisting of Cu: 5% or Less (not Including 0%) and Ni: 5% or Less (not Including 0%)]

Cu dissolves in steel and increases hardness of a surface layer and internal hardness, and thus effectively functions to improve seizing resistance. In addition, Cu finely precipitates during nitriding treatment, and thus has a function of hardening steel. However, if the Cu content is excessive, steel is embrittled. Hence, the Cu content is preferably 5% or less. The Cu content is more preferably 4% or less, and most preferably 3% or less.

Ni has a function of solution-strengthening steel. When Ni is contained together with Cu, Cu can further exhibit the precipitation hardening function. However, if the Ni content is excessive, such effects are saturated. Hence, the Ni content is preferably 5% or less. The Ni content is more preferably 4% or less, and most preferably 3% or less.

The gear of the invention is manufactured in such a manner that steel having the chemical composition as described above is prepared, and the steel is subjected to heat treatment such as annealing as necessary, and is then machined into a predetermined gear shape, and subjected to super-carburizing and quenching and tempering, and is then subjected to nitriding treatment. In this manufacturing process, a typically used process may be used for each of the steps before machining into the gear shape, and the gear-machining is also performed through one of various types of forging/heading such as hot forging, cold forging, and warm forging, form rolling, cutting, grinding, or a combination of such processes.

The super-carburizing and quenching is an important step that is performed for precipitation of carbide, and is substantially divided into a carburizing step and a carbide precipitation step. The steel having the above-described chemical composition is subjected to predetermined super-carburizing and quenching treatment, thereby predetermined microstructure morphology can be achieved. Although tempering is performed in light of prevention of season crack, when nitriding treatment is performed immediately after quenching, the tempering may be omitted. For example, the tempering treatment is performed within a temperature range from 100 to 300° C. for about 1 to 180 min, making it possible to prevent season crack.

The subsequent nitriding treatment is also an important step. Steel, which has the microstructure in the surface-layer part, the microstructure including carbide particles dispersed therein, thanks to the above-described chemical composition and the super-carburizing, is subjected to the nitriding treatment, thereby a predetermined microstructure morphology can be provided, and seizing resistance can be improved. The nitriding treatment may be performed using any of known processes. Examples of such processes include gas nitriding, gas nitrocarburizing, salt bath nitriding, salt bath carbonitriding, ion nitriding, plasma nitriding, tafftriding treatment, gas carbonitriding, and the like. In the invention, plasma nitrocarburizing treatment and plasma nitriding treatment are exemplarily used as the nitriding treatment. In the plasma nitrocarburizing treatment, nitriding treatment is performed through glow discharge in a mixed gas (C mixed gas) of nitrogen, hydrogen, and carbon. In the plasma nitriding treatment, nitriding treatment is performed through glow discharge in a mixed gas of nitrogen and hydrogen. When finish processing such as machining is necessary, the finish processing may be performed before nitriding treatment, or may be performed after nitriding treatment within the scope without affecting the nitrided layer.

In the gear subjected to the nitriding treatment as described above, a nitrided layer having a content of iron nitride of 80 mass % or more exists in the surface-layer part ranging from a gear surface to a depth of 20 μm. In that nitrided layer, a proportion of $Fe_4N$ in the iron nitride is preferably 20 mass % or more. Satisfying such a requirement further improves seizing resistance. The reason why such an effect is exhibited can be considered as follows.

Adhesion wear is caused by interatomic bond due to metal contact. Increasing the proportion of the iron nitride makes the interatomic bond to be less likely to occur, and thus makes it possible to suppress the adhesion wear. The iron nitride formed in the surface layer through nitriding treatment includes various types such as $Fe_{2-3}N$ and $Fe_4N$. Among them, $Fe_4N$ is least likely to induce adhesion wear. Hence, increasing the proportion of $Fe_4N$ further improves seizing resistance. The content of the iron nitride in the nitrided layer is more preferably 85 mass % or more and most preferably 90 mass % or more. The proportion of $Fe_4N$ in the iron nitride is more preferably 25 mass % or more, and most preferably 30 mass % or more.

In the steel components of the invention, Cr, Al, and MO are each an element that easily binds to nitrogen.
If the content of each of such elements increases, diffusion rate of nitrogen becomes lower, and the amount of $Fe_{2-3}N$ increases. An appropriate amount of each of such elements is contained (1.3% or less and preferably 1.2% or less for Cr, 0.040% or less and preferably 0.030% or less for Al, and 0.30% or less and preferably 0.20% or less for Mo), thereby the surface-layer part is formed into a nitrided layer having a large amount of $Fe_4N$, and the adhesion wear can be prevented (see Test Nos. 28 to 30 in a second embodiment described later).

Nitrogen content of the surface-layer part increases through the nitrocarburizing treatment, and $Fe_{2-3}N$ is more easily formed therethrough than through the nitriding treatment. The nitriding treatment is more suitably performed to increase the proportion of $Fe_4N$ (see Test Nos. 24 and 25 in the second embodiment described later). Increased nitriding temperature (about 550 to 630° C. or about 560 to 600° C.) leads to appropriate diffusion of nitrogen and an increase in proportion of $Fe_4N$ (see Test Nos. 24 and 26 in the second embodiment described later).

In the gas fraction in the nitriding treatment condition, increasing the $N_2$ fraction increases the amount of $Fe_{2-3}N$, while decreasing the $N_2$ fraction increases the amount of $Fe_4N$. The $N_2$ fraction is preferably adjusted to an appropriate fraction (about 35 to 55%, preferably about 40 to 45%) in order to secure a preferable amount of iron nitride and a preferable amount of $Fe_4N$ (see Test Nos. 24 and 27 in the second embodiment described later).

In the gear of the invention, a lubrication film is effectively provided on a gear surface to improve seizing resistance. The lubrication film treatment makes it possible to suppress metal contact and thus suppress temperature rise, and suppress occurrence of adhesion wear. In the lubrication film treatment, for example, soft metal such as copper, zinc, and lead, metal oxide such as lead oxide, sulfide such as molybdenum disulfide and tungsten disulfide, fluoride, nitride, graphite, and manganese phosphate are typically exemplified, and a common treatment type and a common treatment method are used as a type and a method of the treatment, respectively.

A condition of super-carburizing (a carburizing condition and a carbide precipitation condition) and a nitriding condition for forming the microstructure of the gear are now described in detail.

[Super-Carburizing Condition]
1. Carburizing Condition
(1) Heating Temperature (Carburizing Temperature): 900 to 980° C.

To perform sufficient carburizing on a steel component, carburizing temperature is preferably 900° C. or higher. If the carburizing temperature is lower than 900° C., time for carburizing is lengthened, and productivity is undesirably reduced. The carburizing temperature is more preferably 910° C. or higher, and most preferably 920° C. or higher. On the other hand, if the carburizing temperature is excessively high, grains are coarsened, and toughness of the steel component is degraded; hence, the carburizing temperature is preferably 980° C. or lower. The carburizing temperature is more preferably 970° C. or lower, and most preferably 950° C. or lower. Although the holding time (carburizing time) at the carburizing temperature may be any time without limitation as long as a desired depth of a carburized layer is obtained, the holding time should be appropriately set within a range from 1 hr to 10 hrs in light of cost.
(2) Heating Atmosphere: Cp (Carbon Potential) 0.9 to 1.5%

The heating atmosphere is preferably controlled such that Cp is 0.9% to 1.5%. If the Cp is excessively low in this step, carbon content of the surface layer of the steel component is lowered, and a sufficient amount of carbide cannot be precipitated in a subsequent carbide precipitation step. As a result, desired seizing resistance is less likely to be secured. On the other hand, although the upper limit of the Cp is not particularly limited, if the Cp is excessively high, "soot" called "sooting" adheres onto a surface of the steel component, which interferes with carburizing. Hence, the upper limit of the Cp is preferably 1.5% or less. The lower limit of the Cp is more preferably 0.95% or more (most preferably 1.0% or more). The upper limit thereof is more preferably 1.3% or less (most preferably 1.2% or less).

The Cp can be measured by a typically used method such as an $O_2$ sensor method, a $CO_2$ method using an infrared analyzer, a dew-point measurement method, and a carbon potentiometer using an iron wire. In particular, a method, in which an iron wire called Cp coil is placed in furnace atmosphere, and Cp is quantitatively analyzed by an infrared absorption method or the like using the Cp coil, is most excellent in light of measurement accuracy.
(3) Average Cooling Rate: 10° C./Min to 4200° C./Min After the steel component is held for a certain time at the carburizing temperature, the steel component is preferably cooled at an average cooling rate of 10° C./min or more. The reason for this is as follows. That is, to precipitate fine carbide particles in the subsequent carbide precipitation step, after the steel component is held for the certain time at the carburizing temperature, the steel component must be temporarily cooled to the Ar1 transformation point while the carburized carbon is dissolved in a supersaturated manner without being precipitated. If the average cooling rate is less than 10° C./min, there is time for the supersaturated carbon to be diffused into grain boundaries, and carbide is precipitated in a reticular manner during precipitation, and consequently various types of strength are reduced. While the upper limit of the average cooling rate is not limited, extremely rapid cooling allows deformation or cracks to easily occur in the steel component. Hence, the average cooling rate is preferably 4200° C./min or less. The lower limit of the average cooling rate is more preferably 13° C./min or more (most preferably 15° C./min or more). The upper limit thereof is more preferably 3600° C./min or less (most preferably 3000° C./min or less).

2. Carbide Precipitation Condition

As described above, fine carbide is precipitated from the carburized layer in which carbon has been dissolved in a supersaturated manner in the carburizing step, thereby seizing resistance of the gear component can be improved. The carbide precipitation condition is now described in detail.

(1) Heating Temperature: 800 to 860° C.

Carbide precipitation is preferably performed within a temperature range from 800° C. to 860° C. If the heating temperature exceeds 860° C., the solid solubility limit of carbon increases, and the amount of precipitated carbon decreases. On the other hand, if the heating temperature is below 800° C., excessively fine carbide is precipitated, which is less responsible for improvement of seizing resistance. The lower limit of the heating temperature is more preferably 820° C. or higher (most preferably 830° C. or higher). The upper limit thereof is more preferably 855° C. or lower (most preferably 850° C. or lower).

(2) Heating Atmosphere: Cp (Carbon Potential) 0.7 to 1.1%

In the carbide precipitation step, carbide is preferably precipitated in an atmosphere of Cp of 0.7% to 1.1%. If the Cp is below 0.7%, decarbonization occurs during the holding at the heating temperature, and an amount of precipitated carbide is decreased. On the other hand, if the Cp exceeds 1.1%, carburizing proceeds during the holding at the heating temperature, resulting in coarsening of carbide, and consequently various types of strength including pitching resistance are undesirably degraded. The lower limit of the Cp is more preferably 0.72% or more (most preferably 0.75% or more). The upper limit thereof is more preferably 1.05% or less (most preferably 1.0% or less). The Cp can be measured by the above-described method.

[Nitriding Condition]

(1) Nitriding Treatment Temperature: 350 to 650° C.

In the invention, the nitriding treatment is controlled such that a predetermined amount of carbide is precipitated, and N is prompted to be diffused into steel and is thus formed into an iron nitride composition in which interatomic bond is less likely to occur, and thereby excellent seizing resistance can be achieved. The reason why the lower limit of the treatment temperature is defined to be 350° C. is because when the nitriding treatment temperature is excessively low, the diffusion rate of N is lowered, and treatment time is lengthened. The reason why the upper limit of the treatment temperature is defined to be 650° C. is because when the nitriding treatment temperature is excessively high, N is effectively prompted to be diffused, but a parent phase matrix is excessively tempered and internal hardness is lowered, and thus properties required for the gear component are not satisfied. Consequently, the nitriding temperature is defined to be within the range from 350° C. to 650° C., thereby the properties required for the gear component are satisfied, and excellent seizing resistance can be exhibited even in a high slippage environment such as an electric car motor. The lower limit of the nitriding temperature is more preferably 400° C. or higher (most preferably 450° C. or higher). The upper limit thereof is more preferably 630° C. or lower (most preferably 600° C. or lower).

(2) Nitriding Treatment Time: 3 to 30 hrs.

The nitriding treatment time (holding time in nitriding treatment) is time necessary for diffusing N into steel to form iron nitride. In general, the diffusion amount of N and the amount of iron nitride are determined by temperature and time in conjunction with each other. In the invention, however, the range for stably providing the predetermined phase is set for each of temperature and time. The nitriding time is defined to be 3 to 30 hrs, thereby a desired phase can be provided, and excellent seizing resistance can be exhibited even in a high slippage environment such as an electric car motor. If the nitriding time is short, less than 3 hrs, a sufficient amount of iron nitride cannot be provided, and if temperature is excessively raised to achieve a desired phase in less than 3 hrs, the parent phase matrix is disadvantageously softened. On the other hand, if the nitriding time exceeds 30 hours, the parent phase matrix is also softened, and if the nitriding treatment is performed at low temperature in order to prevent such softening, N is not sufficiently diffused into steel, and a sufficiently amount of iron nitride disadvantageously cannot be formed.

(3) Nitriding Treatment Atmosphere: Nitrogen Gas Content 30 to 80%

The nitrogen gas content ($N_2$ fraction) in the nitriding treatment atmosphere is controlled such that N is diffused into steel so as to be formed into an iron nitride composition in which interatomic bond is less likely to occur, and thereby excellent seizing resistance can be provided. If the $N_2$ fraction in the atmosphere is below 30%, a sufficient amount of N cannot be contained in steel, and desired gear characteristics cannot be achieved. On the other hand, if the $N_2$ fraction exceeds 80%, and the N content in steel is excessively increased, the composition is changed again into iron nitride in which interatomic bond easily occurs; hence, seizing resistance cannot be improved. The lower limit of the $N_2$ fraction is more preferably 35% or more (most preferably 40% or more). The upper limit thereof is more preferably 75% or less (most preferably 70% or less).

This application claims the benefit of Japanese Priority Patent Application JP 2012-082613 filed Mar. 30, 2012, the entire contents of which are incorporated herein by reference.

EMBODIMENT

Although the invention is now described in detail with embodiments, the invention should not be limited thereto, and it will be appreciated that modifications or alterations thereof may be made within the scope without departing from the gist described before and later, all of which are included in the technical scope of the invention.

First Embodiment

Various types of steel having chemical compositions shown in Tables 1 and 2 (steel type V is steel corresponding to JIS SCM420) were melted in a small furnace so as to be formed into ingots that were then hot-forged and subjected to solution treatment and normalizing treatment, and were each then crudely machined into a shape of a roller pitching test specimen 26 mm in diameter and 130 mm in length. The resultant test specimens were subjected to super-carburizing treatment (carburizing treatment and carbide precipitation treatment) in various patterns illustrated in FIG. 1 ((a) to (f) of FIG. 1).

TABLE 1

| Steel type | Chemical Composition* (mass %) | | | | | | | | | | | | | | |
|---|---|---|---|---|---|---|---|---|---|---|---|---|---|---|---|
| | C | Si | Mn | P | S | Cr | Al | N | Mo | V | Ti | Nb | B | Cu | Ni |
| A | 0.39 | 0.77 | 1.43 | 0.019 | 0.023 | 1.94 | 0.059 | 0.0067 | — | — | — | — | — | — | — |
| B | 0.20 | 0.47 | 1.24 | 0.023 | 0.014 | 1.61 | 0.037 | 0.0068 | — | — | — | — | — | — | — |
| C | 0.40 | 0.19 | 1.81 | 0.009 | 0.025 | 1.12 | 0.045 | 0.0118 | — | — | — | — | — | — | — |
| D | 0.27 | 0.38 | 1.15 | 0.014 | 0.022 | 1.97 | 0.030 | 0.0083 | — | — | — | — | — | — | — |
| E | 0.23 | 0.87 | 1.81 | 0.011 | 0.022 | 1.86 | 0.089 | 0.0098 | — | — | — | — | — | 0.32 | 0.21 |
| F | 0.44 | 0.65 | 1.36 | 0.021 | 0.025 | 1.35 | 0.041 | 0.0056 | — | — | — | — | — | — | — |
| G | 0.15 | 0.31 | 1.06 | 0.019 | 0.018 | 1.67 | 0.031 | 0.0075 | — | — | — | — | 0.0025 | — | — |
| H | 0.25 | 0.12 | 1.97 | 0.007 | 0.012 | 0.93 | 0.035 | 0.0107 | 0.08 | — | — | — | — | — | — |
| I | 0.20 | 0.40 | 1.51 | 0.013 | 0.006 | 1.56 | 0.017 | 0.0090 | — | — | — | — | — | — | — |
| J | 0.17 | 0.13 | 1.64 | 0.018 | 0.007 | 1.28 | 0.029 | 0.0106 | 0.25 | — | — | — | — | — | — |
| K | 0.27 | 0.61 | 1.74 | 0.024 | 0.007 | 1.66 | 0.024 | 0.0112 | — | — | 0.05 | — | — | — | — |

*Remainder: Fe and inevitable impurities

TABLE 2

| Steel type | Chemical Composition* (mass %) | | | | | | | | | | | | | | |
|---|---|---|---|---|---|---|---|---|---|---|---|---|---|---|---|
| | C | Si | Mn | P | S | Cr | Al | N | Mo | V | Ti | Nb | B | Cu | Ni |
| L | 0.40 | 0.54 | 1.79 | 0.023 | 0.009 | 1.53 | 0.055 | 0.0087 | — | 0.13 | — | — | — | — | — |
| M | 0.29 | 0.44 | 1.46 | 0.016 | 0.016 | 1.57 | 0.039 | 0.0094 | — | — | — | 0.17 | — | — | — |
| N | 0.38 | 1.00 | 1.98 | 0.008 | 0.017 | 1.45 | 0.029 | 0.0122 | 0.46 | — | — | — | — | — | — |
| O | 0.21 | 0.77 | 1.12 | 0.007 | 0.015 | 1.16 | 0.040 | 0.0086 | — | — | — | — | — | — | — |
| P | 0.31 | 0.30 | 1.19 | 0.012 | 0.018 | 1.33 | 0.020 | 0.0072 | — | — | — | — | — | — | — |
| Q | 0.29 | 0.90 | 1.73 | 0.012 | 0.018 | 1.74 | 0.030 | 0.0068 | — | — | — | — | — | — | — |
| R | 0.32 | 0.35 | 1.03 | 0.020 | 0.020 | 1.55 | 0.030 | 0.0100 | 0.27 | — | — | — | — | — | — |
| S | 0.35 | 0.80 | 1.25 | 0.020 | 0.020 | 0.64 | 0.030 | 0.0100 | 0.15 | — | — | — | — | — | — |
| T | 0.46 | 0.27 | 1.06 | 0.007 | 0.015 | 1.19 | 0.020 | 0.0057 | — | — | — | — | — | — | — |
| U | 0.38 | 1.10 | 2.06 | 0.008 | 0.017 | 1.52 | 0.029 | 0.0122 | 0.46 | — | — | — | — | — | — |
| V | 0.23 | 0.28 | 0.85 | 0.020 | 0.020 | 1.05 | 0.030 | 0.0100 | 0.20 | — | — | — | — | — | — |

*Remainder: Fe and inevitable impurities

Figure 1:
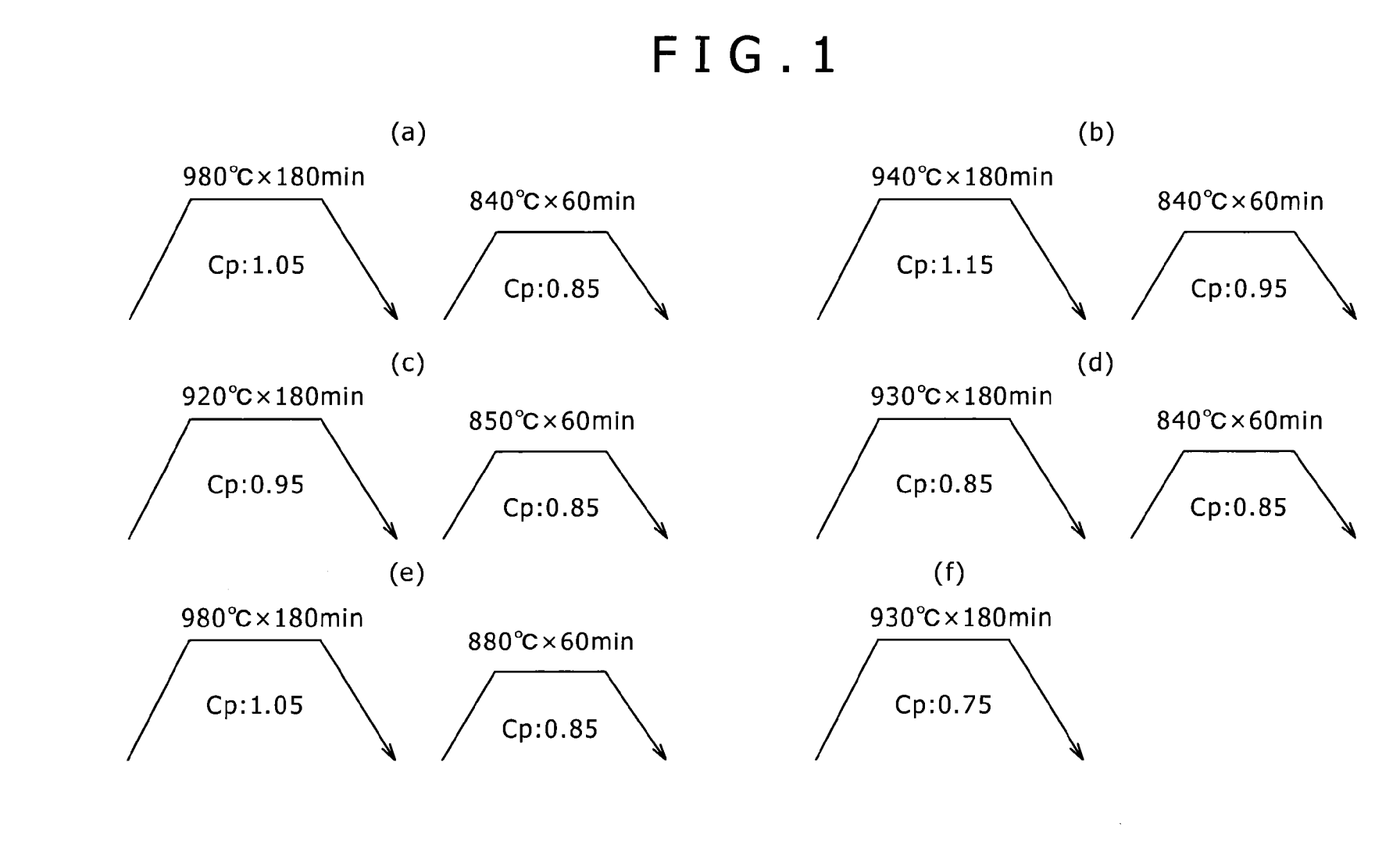
FIG. 1 includes schematic diagrams illustrating various patterns of super-carburizing treatment (steps of carburizing and carbide precipitation) used in an embodiment.
Figure 2:
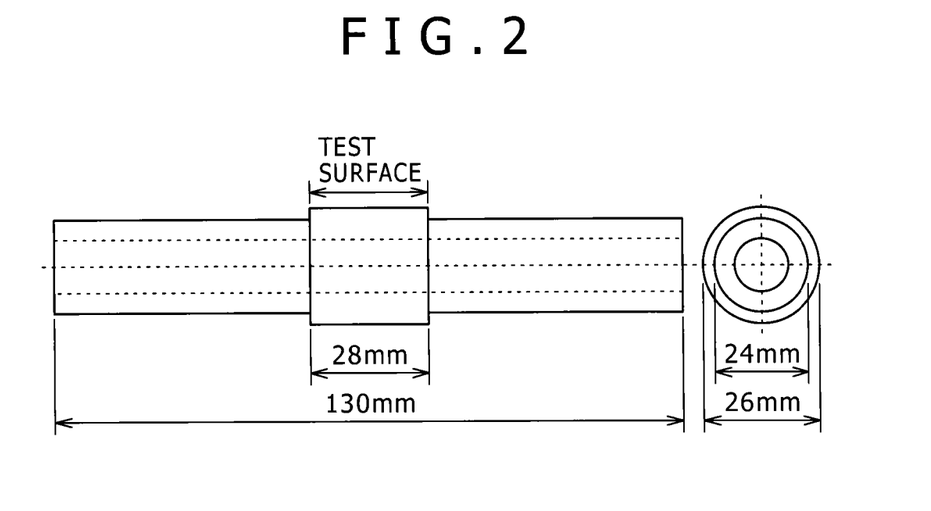
FIG. 2 is a schematic illustration of a test specimen used in a roller pitching test.

In FIG. 1, each test specimen was allowed to stand in a high carbon potential (Cp) atmosphere in a first stage so as to be subjected to super-carburizing, and was reheated in a second stage so that fine carbide was precipitated in a carburized part of a surface layer. In this operation, the test specimen was cooled at an average cooling rate of 50° C./sec after the super-carburizing. The test specimen was then tempered, and then subjected to plasma nitrocarburizing treatment (which may be simply referred to as "nitriding treatment" hereinafter), so that a phase containing nitrogen in high content was formed in the surface-layer part. After the nitriding treatment, the test specimen was finished into a roller pitching test specimen. FIG. 2 illustrates a shape (after finishing) of the roller pitching test specimen.

Tables 3 and 4 show conditions (heating temperature, holding time, and a $N_2$ fraction (other fractions include C mixed gas ($C_3H_8$): 1% and a $H_2$ fraction as the remainder) of such nitriding treatment together with the various patterns (indicated by subscripts (a) to (f)) illustrated in FIG. 1 (Test Nos. 1 to 23).

TABLE 3

| | | | Nitriding treatment condition | | |
|---|---|---|---|---|---|
| Test No. | Steel type | Super-carburizing treatment pattern | Heating temperature (° C.) | Holding time (hour) | $N_2$ fraction (%) |
| 1 | A | (a) | 550 | 5 | 66 |
| 2 | B | (a) | 550 | 5 | 66 |
| 3 | C | (c) | 550 | 5 | 66 |
| 4 | D | (b) | 550 | 5 | 66 |
| 5 | E | (a) | 550 | 5 | 66 |
| 6 | F | (a) | 550 | 5 | 66 |
| 7 | G | (b) | 550 | 5 | 66 |
| 8 | H | (a) | 550 | 5 | 66 |
| 9 | I | (a) | 550 | 5 | 66 |
| 10 | J | (a) | 550 | 5 | 66 |
| 11 | K | (a) | 550 | 5 | 66 |

TABLE 4

| | | | Nitriding treatment condition | | |
|---|---|---|---|---|---|
| Test No. | Steel type | Super-carburizing treatment pattern | Heating temperature (° C.) | Holding time (hour) | $N_2$ fraction (%) |
| 12 | L | (c) | 550 | 5 | 66 |
| 13 | M | (a) | 550 | 5 | 66 |
| 14 | N | (a) | 550 | 5 | 66 |
| 15 | N | (a) | 550 | 5 | 66 |
| 16 | O | (a) | 550 | 5 | 25 |
| 17 | P | (e) | 550 | 5 | 66 |
| 18 | Q | (a) | 550 | 5 | 85 |
| 19 | R | (d) | 570 | 5 | 66 |
| 20 | S | (c) | 550 | 5 | 66 |
| 21 | T | (c) | 550 | 5 | 66 |
| 22 | U | — | 550 | 5 | 66 |
| 23 | V | (f) | — | — | — |

Each of the resultant test specimens was subjected to determination of each of phases (area percentage of carbide and area percentage of retained austenite) of a surface-layer part and determination of nitrogen content at a depth of 20 μm below its surface according to procedures described below, and was subjected to determination of component properties (seizing resistance) according to a procedure described below.

[Method of Determining Area Percentage of Carbide of Surface-Layer Part]

The area percentage of carbide in the phase (the main phase is at least one of tempered martensite and tempered bainite) was determined in such a manner that each test specimen subjected to nitriding treatment was cut along a cross section, buried in resin, mirror-polished, and etched so as to be formed into a sample, and the area percentage was determined at a depth position of 20 μm below the surface of the sample using a scanning electron microscope (SEM). Carbon is diffused from the surface layer to the inside through super-carburizing. As a result, a carbon-thickened layer is formed from the surface-layer part to the inside, and carbide is accordingly formed. Here, carbide in the vicinity of the surface is important, i.e., it is necessary that the carbide in the vicinity of the surface exists at least 5% by area percentage. However, the carbide in the vicinity of the surface was difficult to be directly measured. In this embodiment, therefore, carbide at a depth position of 20 μm below the surface, the carbide having substantially the same area percentage as that of carbide in the vicinity of the surface, was defined to be the carbide in the vicinity of the surface, and it was defined to be a requirement of the invention that such carbide had an area percentage of 5% or more. An appropriate 9 μm×12 μm visual field was observed at 8000 magnifications, and a carbide region was identified using an image analysis software and the area percentage of the carbide region was obtained. Such measurement was performed in three visual fields, and the arithmetic mean of the measurement values in the three visual fields was defined to be the area percentage of carbide.

[Method of Determining Area Percentage of Retained Austenite]

Part of each test specimen was sampled, and was subjected to determination of area percentage of retained austenite using a micro-X-ray tube over a range from the surface to a depth position of 200 μm at a 50 μm pitch interval (at five places), and the sum of resultant amount of retained austenite (area percentage of retained γ) was divided by five (the number of measurement places), and a value obtained by such division was used as the area percentage of retained austenite.

[Method of Determining Nitrogen Content at Depth of 20 μm Below Surface]

The nitrogen content of the surface-layer part (at the depth position of 20 μm below the surface) was determined in such a manner that each of the test specimens was cut along a cross section, buried in resin, and mirror-polished, and then nitrogen content was measured from the surface-layer part to the inside through analysis using an electron probe microanalyzer (EPMA).

[Method of Evaluating Component Properties]

A roller pitching test was performed as a method of evaluating the component properties. The roller pitching test was conducted by a roller pitching tester using the test specimen (a small roller) and a large roller (a counter part) made of high carbon-chromium bearing steel SUJ2. The test was conducted under a condition of rotation speed: 1000 rpm, relative slippage ratio: 700%, and oil temperature: 90° C. to obtain a rotational frequency before the tester was stopped due to vibration caused by seizing. Here, the rotational frequency was used as seizing life while the frequency of $20,000 \times 10^3$ was the upper limit. A test specimen that was not seized before the frequency of $10,000 \times 10^3$ was determined to be excellent in seizing resistance.

Tables 5 and 6 show results of such determination (the area percentage of carbide, the area percentage of retained γ, the nitrogen content of the surface-layer part, and the seizing life) together with presence or absence of the lubrication film (manganese phosphate was used as the lubrication film). In the item of seizing life of Table 6, a representation of ">20,000" indicates that seizing did not occur even at the frequency of $20,000 \times 10^3$.

TABLE 5

| Test No. | Area percentage of carbide (%) | Area percentage of retained γ (%) | Nitrogen content of surface-layer part (%) | Lubrication film | Seizing life (frequencies, $\times 10^3$) |
|---|---|---|---|---|---|
| 1 | 15.6 | 3.7 | 5.7 | Not provided | 18257 |
| 2 | 12.4 | 2.6 | 3.3 | Not provided | 12885 |
| 3 | 6.4 | 1.5 | 3.6 | Not provided | 14158 |
| 4 | 17.0 | 1.8 | 5.4 | Not provided | 18747 |
| 5 | 12.8 | 4.6 | 5.2 | Not provided | 18432 |
| 6 | 8.1 | 1.7 | 2.5 | Not provided | 13422 |
| 7 | 12.9 | 1.2 | 4.0 | Not provided | 15788 |
| 8 | 6.7 | 2.7 | 3.4 | Not provided | 12918 |
| 9 | 10.3 | 2.9 | 4.1 | Not provided | 17373 |
| 10 | 10.7 | 3.6 | 4.2 | Not provided | 17842 |
| 11 | 9.5 | 3.5 | 2.9 | Not provided | 16657 |

TABLE 6

| Test No. | Area percentage of carbide (%) | Area percentage of retained γ (%) | Nitrogen content of surface-layer part (%) | Lubrication film | Seizing life (frequencies, $\times 10^3$) |
|---|---|---|---|---|---|
| 12 | 8.7 | 1.0 | 3.9 | Not provided | 16182 |
| 13 | 11.5 | 3.2 | 4.6 | Not provided | 18466 |
| 14 | 11.6 | 5.1 | 4.3 | Not provided | 17446 |
| 15 | 11.6 | 5.1 | 4.3 | Provided | >20000 |
| 16 | 7.4 | 1.5 | 1.5 | Not provided | 4563 |
| 17 | 4.4 | 0.2 | 4.3 | Not provided | 5094 |
| 18 | 12.6 | 3.7 | 7.3 | Not provided | 7702 |
| 19 | 3.8 | 0.2 | 2.2 | Not provided | 3775 |
| 20 | 1.9 | 0.2 | 2.6 | Not provided | 4305 |
| 21 | 3.6 | 0.2 | 1.7 | Not provided | 2642 |
| 22 | 0.0 | 4.6 | 1.6 | Not provided | 88 |
| 23 | 0.0 | 16.3 | 0.1 | Provided | 2 |

The following consideration can be made from these results. In Test Nos. 1 to 15, since the chemical composition and the manufacturing condition of the steel are each controlled to be within an appropriate range, any of the area percentage of carbide, the area percentage of retained γ, and the nitrogen content of the surface-layer part can be controlled to be within the range defined in the invention. As a result, steel is excellent in adhesion suppression effect, and can exhibit excellent seizing resistance. Furthermore, excellent seizing resistance can also be provided through formation of the lubrication film.

In contrast, in each of Test Nos. 16 to 23, since the chemical composition or the manufacturing condition of steel is not controlled to be within an appropriate range, seizing resistance is degraded. Specifically, in Test No. 16, since the nitrogen gas content ($N_2$ fraction) in nitriding treatment is too low, nitrogen content of the surface-layer part is insufficient, and seizing resistance is degraded. In Test No. 17, since heating temperature in carbide precipitation is extremely high, 880° C., (a heat treatment pattern (e) of FIG. 1), the area percentage of carbide cannot be secured, and seizing resistance is degraded.

In Test No. 18, since the nitrogen gas content ($N_2$ fraction) in nitriding treatment is too high, nitrogen is excessively thickened in the surface-layer part, and seizing resistance is degraded. In Test No. 19, since carbon potential (Cp) in carburizing is low (the heat treatment pattern (d) of FIG. 1), the area percentage of carbide cannot be secured, and seizing resistance is degraded.

In Test No. 20, a steel type (steel type S) having a low Cr content is used, and while a manufacturing condition is appropriate, the area percentage of carbide cannot be secured, and seizing resistance is degraded. In Test No. 21, a steel type (steel type T) having an excessive C content is used, which results in insufficient amount of infiltration of carbon during carburizing, and therefore the area percentage of carbide cannot be secured. In addition, since nitrogen content of the surface layer is low, seizing resistance is degraded.

In Test No. 22, since super-carburizing treatment is omitted, the area percentage of carbide cannot be secured. In addition, since nitrogen content of the surface layer is low, seizing resistance is degraded. In Test No. 23, the steel corresponding to JIS SCM420 is subjected to lubrication film treatment after carburizing, but is not subjected to super-carburizing treatment and nitriding treatment (the heat treatment pattern (f) of FIG. 1), and therefore the area percentage of carbide cannot be secured. In addition, nitrogen content of the surface layer is low and a large amount of retained γ exists, and therefore seizing resistance is extremely degraded.

Second Embodiment

Various types of steel having chemical compositions shown in Table 7 (steel types B, W, X, and Y: steel type B is the same as the steel type B shown in Table 1) were melted in a small furnace so as to be formed into ingots that were then hot-forged and subjected to solution treatment and normalizing treatment, and were each then crudely machined into a shape of a roller pitching test specimen 26 mm in diameter and 130 mm in length. The resultant test specimens were subjected to super-carburizing treatment (carburizing treatment and carbide precipitation treatment) in the heat treatment pattern illustrated in (a) of FIG. 1. In this operation, each test specimen was cooled at an average cooling rate of 50° C./sec after the super-carburizing. The test specimen was then tempered, and then subjected to nitriding treatment (plasma nitrocarburizing treatment or plasma nitriding treatment), so that a phase containing nitrogen in high content was formed in the surface-layer part. After the nitriding treatment, the test specimen was finished into a roller pitching test specimen. The roller pitching test specimen was subjected to a roller pitching test as in the first embodiment.

TABLE 7

| Steel type | Chemical Composition* (mass %) | | | | | | | | |
|---|---|---|---|---|---|---|---|---|---|
| | C | Si | Mn | P | S | Cr | Al | N | Mo |
| B | 0.20 | 0.47 | 1.24 | 0.023 | 0.014 | 1.61 | 0.037 | 0.0068 | — |
| W | 0.38 | 0.32 | 1.50 | 0.015 | 0.007 | 1.85 | 0.075 | 0.0102 | 0.41 |
| X | 0.40 | 0.41 | 1.47 | 0.012 | 0.012 | 1.17 | 0.052 | 0.0110 | 0.29 |
| Y | 0.42 | 0.28 | 1.44 | 0.010 | 0.015 | 1.65 | 0.025 | 0.0101 | — |

*Remainder: Fe and inevitable impurities

Table 8 shows conditions (heating temperature, holding time, and gas fractions (a fraction of each of $N_2$ gas, $H_2$ gas, and C mixed gas) of such nitriding treatment (Test Nos. 24 to 30).

TABLE 8

| Test No. | Steel type | Super-carburizing treatment pattern | Nitriding condition | | | | | |
|---|---|---|---|---|---|---|---|---|
| | | | Heating temperature (° C.) | Holding time (hour) | $N_2$ fraction | $H_2$ fraction | C mixed-gas fraction | Nitriding treatment type |
| 24 | B | (a) | 520 | 5 | 60 | 39 | $C_3H_8$:1 | Plasma nitrocarburizing treatment |
| 25 | B | (a) | 520 | 5 | 60 | 40 | 0 | Plasma nitriding treatment |
| 26 | B | (a) | 570 | 5 | 60 | 39 | $C_3H_8$:1 | Plasma nitrocarburizing treatment |
| 27 | B | (a) | 520 | 5 | 40 | 59 | $C_3H_8$:1 | Plasma nitrocarburizing treatment |
| 28 | W | (a) | 570 | 5 | 60 | 39 | $C_3H_8$:1 | Plasma nitrocarburizing treatment |
| 29 | X | (a) | 570 | 5 | 60 | 39 | $C_3H_8$:1 | Plasma nitrocarburizing treatment |
| 30 | Y | (a) | 570 | 5 | 60 | 39 | $C_3H_8$:1 | Plasma nitrocarburizing treatment |

Each of the resultant test specimens was subjected to determination of each of phases (area percentage of carbide and area percentage of retained γ) of a surface-layer part, nitrogen content at a depth of 20 μm below its surface, and component properties (seizing resistance) according to the procedures as described in the first embodiment, and was subjected to determination of a nitride layer composition according to a procedure described below.

(Method of Determining Nitride Layer Composition)

Part of each test specimen was sampled, and was subjected to X-ray diffraction under the following condition in a surface-layer part (a surface-layer part ranging from the surface to a depth of 20 μm) of the test specimen.

(Measurement Condition of X-Ray Diffraction)

Analyzer: two-dimensional micro-X-ray diffractometer "RINT-RAPID II" from Rigaku Corporation.

(1) Analysis Condition

Tube amplifier: Co, monochromating: monochrometer (Kα line), tube amplifier output: 40 kV-26 mA, detector: (two-dimensional) imaging plate.

(2) Reflection Method

Collimator: ϕ 300 μm, ω angle (X-ray incident angle): 22° to 30°, oscillation (1°/sec).

φ angle (inplane rotation): fixed, measurement time (exposure): 30 min

Compounds existing in a surface layer of each test specimen were identified from the resultant X-ray diffraction profiles. The identified compounds (components) were analyzed by a semiquantitative method with peak separation so that relative content of each component was obtained. A proportion of iron nitride in the surface layer means a proportion (mass %) of the total relative content of $Fe_4N$ and $Fe_{2-3}N$ in the sum (100 mass %) of relative content of all components that were found to exist in the surface layer as a result of the X-ray diffraction. A proportion of $Fe_4N$ in the iron nitride means a proportion (mass %) of the relative content of $Fe_4N$ in the total relative content of $Fe_4N$ and $Fe_{2-3}N$. Values of such proportions were calculated by the following formulas. Here, all the components existing in the surface layer of the test specimen include $Fe_4N$, $Fe_{2-3}N$, $Fe_5C_2$, $Fe_3C$, γ-Fe, α-Fe, and the like, and the total proportion of such components is basically 100%, but a small amount (5% or less) of each of other components (for example, $Fe_2C$, $Fe_{22}C$, $Fe_7C_3$, and the like) may be contained (if such components are contained, the total proportion including such components is 100%).

Proportion of iron nitride (mass %)={relative content (mass %) of $Fe_4N$ in surface layer+relative content (mass %) of $Fe_{2-3}N$ in surface layer}

Proportion of $Fe_4N$ (mass %) in iron nitride={relative content (mass %) of $Fe_4N$)/[relative content (mass %) of $Fe_4N$+relative content (mass %) of $Fe_{2-3}N$]}×100(%)

Table 9 collectively shows results of such calculations.

TABLE 9

| Test No. | Area percentage of carbide (%) | Area percentage of retained γ (%) | Nitrogen content of surface-layer part (%) | Nitrided layer composition | | Lubrication film | Seizing life (frequencies, ×10³) |
|---|---|---|---|---|---|---|---|
| | | | | Proportion of iron nitride (mass %) | Proportion of $Fe_4N$ (mass %) | | |
| 24 | 12.5 | 3.1 | 3.5 | 73 | 10 | Not provided | 13995 |
| 25 | 12.0 | 2.9 | 2.8 | 85 | 30 | Not provided | >20000 |
| 26 | 11.7 | 1.9 | 3.0 | 90 | 22 | Not provided | 19363 |
| 27 | 12.2 | 2.6 | 2.5 | 86 | 38 | Not provided | >20000 |
| 28 | 12.1 | 3.7 | 4.3 | 88 | 11 | Not provided | 17428 |
| 29 | 5.7 | 1.7 | 2.6 | 90 | 30 | Not provided | >20000 |
| 30 | 8.2 | 1.5 | 3.5 | 92 | 26 | Not provided | >20000 |

As is clear from such results, since the chemical composition and the manufacturing condition of the steel are each controlled to be within an appropriate range in each case, any of the area percentage of carbide, the area percentage of retained γ, and the nitrogen content of the surface-layer part can be controlled to be within the range defined in the invention. As a result, the steel is excellent in adhesion suppression effect, and can exhibit excellent seizing resistance. In particular, Test Nos. 25 to 27, 29, and 30 further satisfies the preferred requirement of the nitrided layer composition, and exhibits particularly excellent seizing resistance.

INDUSTRIAL APPLICABILITY

The gear of the invention has a predetermined chemical composition, and has a surface-layer part that includes a steel microstructure including at least one phase of tempered martensite and tempered bainite, 1 to 10% retained austenite by area percentage, and 5% or more carbide being precipi- tated by area percentage, and the gear has a nitrogen content of 2.0 to 6.0% at a depth of 20 µm below a surface of the gear, and thereby exhibits more excellent seizing resistance in a power transmission part subjected to high rotation and high slippage, for which the lubricating oil having a low kinematic viscosity is used.

The invention claimed is:

1. A gear prepared by subjecting a gear precursor comprising iron and, in mass percent:
C: 0.15 to 0.45%,
Si: 0.05 to 1.0%,
Mn: 1.0 to 2.0%,
P: 0.05% or less,
S: 0.05% or less,
Cr: 0.9 to 2%,
Al: 0.01 to 0.1%, and
N: 0.02% or less,
to super-carburizing, quenching, optional tempering, and nitriding, in that order,
wherein said gear has a surface-layer part ranging from the surface of the gear to a depth of 20 µm below the surface of the gear that has a steel microstructure comprising a phase of tempered martensite, a phase of tempered bainite, or a composite phase of tempered martensite and tempered bainite, 1 to 10% retained austenite by area percentage, and 5% or more carbide being precipitated by area percentage, the gear also having a nitrogen content of 2.0 to 6.0% in said surface-layer part.

2. The gear according to claim 1, the gear precursor further comprising: Mo: 0.5% or less (not including 0%).

3. The gear according to claim 1 the gear precursor further comprising at least one element selected from the group consisting of V: 0.2% or less (not including 0%), Ti: 0.1% or less (not including 0%), and Nb: 0.2% or less (not including 0%).

4. The gear according to claim 1, the gear precursor further comprising: B: 0.01% or less (not including 0%).

5. The gear according to claim 1, the gear precursor further comprising at least one element selected from the group consisting of Cu: 5% or less (not including 0%) and Ni: 5% or less (not including 0%).

6. The gear according to claim 1, wherein a nitrided layer having a content of iron nitride of 80 mass % or more exists in the surface-layer part ranging from the surface to the depth of 20 µm, and the nitrided layer has a proportion of $Fe_4N$ of 20 mass % or more in the iron nitride.

7. The gear according to claim 1, further comprising a lubrication film on a surface thereof.

8. An electric car motor comprising the gear according to claim 1.

9. The gear according to claim 1, prepared by subjecting said gear precursor to super-carburizing, quenching, tempering, and nitriding, in that order.

10. The gear according to claim 1, prepared by subjecting said gear precursor to super-carburizing, quenching, and nitriding, in that order.

11. The gear according to claim 1, wherein said surface-layer part has 2 to 9% retained austenite by area percentage, 6% or more carbide precipitated by area percentage, and a nitrogen content of 3.2 to 5.8%.

12. The gear according to claim 1, wherein said surface-layer part has 3 to 8% retained austenite by area percentage, 7% or more carbide precipitated by area percentage, and a nitrogen content of 3.5 to 5.5%.

13. The gear according to claim 1, wherein the gear precursor comprises iron and, in mass percent:
C: 0.20 to 0.35%,
Si: 0.15 to 0.5%,
Mn: 1.2 to 1.7%,
P: 0.040% or less,
S: 0.040% or less,
Cr: 01.2 to 1.8%,
Al: 0.020 to 0.06%, and
N: 0.016% or less.

14. The gear according to claim 1, wherein a nitrided layer having a content of iron nitride of 90 mass % or more exists in the surface-layer part ranging from the surface to the depth of 20 μm, and the nitrided layer has a proportion of $Fe_4N$ of 30 mass % or more in the iron nitride.

15. The gear according to claim 13, wherein a nitrided layer having a content of iron nitride of 90 mass % or more exists in the surface-layer part ranging from the surface to the depth of 20 μm, and the nitrided layer has a proportion of $Fe_4N$ of 30 mass % or more in the iron nitride.

16. The gear according to claim 15, wherein said surface-layer part has 3 to 8% retained austenite by area percentage, 7% or more carbide precipitated by area percentage, and a nitrogen content of 3.5 to 5.5%.

17. The gear according to claim 1, wherein the surface-layer part has a steel microstructure comprising a phase of tempered martensite.

18. The gear according to claim 1, wherein the surface-layer part has a steel microstructure comprising a phase of tempered bainite.

19. The gear according to claim 1, wherein the content of Si in the gear precursor is 0.10 to 1.0%.

20. The gear according to claim 1, wherein the surface-layer part has a steel microstructure comprising a composite phase of tempered martensite and tempered bainite.

* * * * *